(12) United States Patent
Takazawa et al.

(10) Patent No.: US 8,543,290 B2
(45) Date of Patent: Sep. 24, 2013

(54) VEHICLE INFORMATION PROVIDING DEVICE

(75) Inventors: Atsuyoshi Takazawa, Tokyo (JP); Norimasa Kaneko, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 331 days.

(21) Appl. No.: 12/942,508

(22) Filed: Nov. 9, 2010

(65) Prior Publication Data

US 2011/0112746 A1 May 12, 2011

(30) Foreign Application Priority Data

Nov. 11, 2009 (JP) ................. 2009-258138

(51) Int. Cl.
*G01C 21/00* (2006.01)
*G01C 21/26* (2006.01)
*G06F 17/00* (2006.01)
*G05D 1/02* (2006.01)
*G08G 1/00* (2006.01)
*G08G 1/123* (2006.01)
*G08G 1/133* (2006.01)

(52) U.S. Cl.
USPC ............ 701/36; 701/117; 701/409; 701/412; 701/422; 701/423; 701/431; 701/439; 701/300; 340/901; 340/988; 340/995.1; 340/995.13; 340/995.2

(58) Field of Classification Search
USPC ................ 701/1, 117, 400, 428, 300, 301, 2, 701/23–25, 28, 36, 45, 70, 93, 116, 119, 701/408–410, 412, 415, 418, 422, 423, 430–432, 701/436, 437, 439, 454, 457, 460, 461, 465, 701/468; 340/995.1, 995.11, 995.19, 995.2, 340/901–903, 988–991, 995.12–995.14, 340/995.17, 995.18, 995.26
See application file for complete search history.

(56) References Cited

U.S. PATENT DOCUMENTS

| | | | | |
|---|---|---|---|---|
| 5,907,293 | A * | 5/1999 | Tognazzini | 340/903 |
| 7,151,467 | B2 * | 12/2006 | Fujita et al. | 340/902 |
| 2003/0043030 | A1 * | 3/2003 | Kudo | 340/435 |
| 2006/0224301 | A1 * | 10/2006 | Sakagami et al. | 701/200 |
| 2007/0282532 | A1 * | 12/2007 | Yamamoto et al. | 701/301 |

FOREIGN PATENT DOCUMENTS

JP  2002-340583  11/2002

\* cited by examiner

*Primary Examiner* — Thomas Tarcza
*Assistant Examiner* — Edward Pipala
(74) *Attorney, Agent, or Firm* — Smith, Gambrell and Russell, LLP (57) ABSTRACT

An information processing unit displays a pop-up window in a display area of a display unit when the own vehicle is in an area of a set distance or less away from an extracted intersection, when the own vehicle stops, when a brake switch is ON, and when a display request for an image of traffic conditions of vehicles at the intersection by the driver is recognized. If an accelerator operation is performed in a predetermined way after the pop-up window is displayed, the display of the pop-up window is finished.

20 Claims, 10 Drawing Sheets

VEHICLE INFORMATION PROVIDING DEVICE

CROSS-REFERENCE TO RELATED APPLICATIONS

The present application claims priority from Japanese Patent Application No. 2009-258138 filed on Nov. 11, 2009, and is hereby incorporated by reference in its entirety.

BACKGROUND OF THE INVENTION

1. Field of the Invention

The present invention relates to a vehicle information providing device for providing traffic conditions at an intersection to a driver at an appropriate timing.

2. Description of the Related Art

In recent years, in the field of vehicles, there have been proposed and put to practical use various drive assistance devices for assisting drive to help safe traveling by recognizing front environment based on information obtained from an ITS (Intelligent Transport Systems), an inter-vehicle communication system, an onboard image processing system, a radar device, or the like.

As a vehicle information providing device of such a drive assistance device, Japanese Patent Unexamined Application Publication (JP-A) No. 2002-340583 (hereinafter, referred to as Patent Document 1) discloses a technique for a device for displaying information of other vehicles obtained by inter-vehicle communication or road-vehicle communication together with information of the own vehicle on a map, wherein traveling conditions of the own vehicle and other vehicles are compared, other vehicles that are anticipated to affect travel of the own vehicle are determined, the determined other vehicles are displayed on the map as characters, and the characters are displayed while changing display style of the characters according to information of other vehicles obtained by the communication, for example.

When a vehicle makes a right turn at an intersection or passes through an intersection, it is normally preferable that a driver drive while checking the traffic environment with his or her own eyes. However, there may be a blind spot due to a right-turning oncoming vehicle, building, or the like, in which case the information providing device disclosed in Patent Document 1 greatly exhibits its performance in complementing information for drivers. However, if display by an information providing device is performed more than necessary, a viewing direction (interest) of a driver is not oriented to check the actual traffic environment and spreads to the information providing device so that the intended purpose of drive assistance, that is, to improve safety, may not be achieved.

SUMMARY OF THE INVENTION

The present invention is made in view of the aforementioned problems, and aims to provide a vehicle information providing device capable of enhancing safety by appropriately providing necessary information to a driver when needed at the time that a vehicle makes a right turn at an intersection or passes through an intersection, without preventing the driver from visually checking the traffic environment with his or her own eyes while driving.

The present invention is a vehicle information providing device including: information transmitting and receiving means for communicating between vehicles; own vehicle position detecting means for detecting a position of an own vehicle; map data storing means for storing road map data that can be freely displayed on displaying means; intersection image data storing means for storing image data for representing traffic conditions of vehicles at least an intersection on the displaying means; and processing means for extracting an intersection to be entered by the own vehicle from the road map data, and generating an image of traffic conditions of vehicles at the intersection using the image data in the intersection image data storing means based on the information obtained by the information transmitting and receiving means and displaying the image on the displaying means at least when the own vehicle is in an area of a preset distance or less away from a position of the intersection based on the position of the intersection and a position of the own vehicle and when the own vehicle stops.

According to the vehicle information providing device of the present invention, when a vehicle makes a right turn at an intersection or passes through an intersection, necessary information is appropriately provided to the driver when needed without preventing the driver from visually checking the traffic environment with his or her own eyes while driving, and thereby safety can be enhanced.

DETAILED DESCRIPTION OF THE PREFERRED EMBODIMENTS

Hereinafter, an embodiment of the present invention will be described with reference to the drawings.

Figure 1:
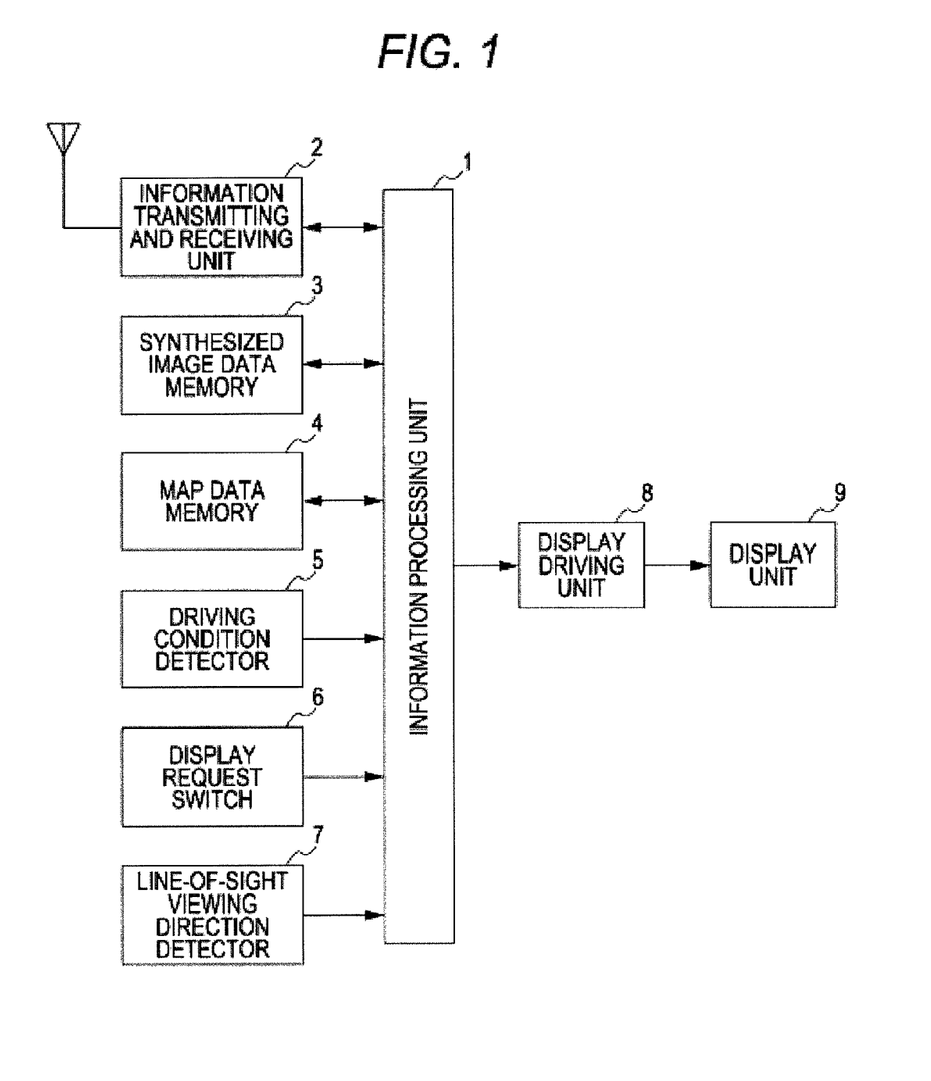
FIG. 1 is a configuration view of a vehicle information providing device according to an embodiment of the present invention.

A vehicle information providing device shown in FIG. 1 is mounted on a vehicle such as a truck, an automobile, and a two-wheeled motor vehicle and has an information processing unit 1 configured mainly with a computer such as a microcomputer. This information processing unit 1 is connected with an information transmitting and receiving unit 2, a synthesized image data memory 3, and a map data memory 4 so as to be bi-directionally communicatable. An input side of the information processing unit 1 is connected with a driving condition detector 5, a display request switch 6, and a line-of-sight viewing direction detector. An output side of the information processing unit 1 is connected with a display unit 9 such as a liquid crystal monitor via a display driving unit 8. The display unit 9 is arranged on an instrument panel at a position which can be easily viewed by a driver.

The information transmitting and receiving unit 2 is provided with narrow area wireless communication having a communication area of approximately 100 [m] such as a wireless LAN and has both of an inter-vehicle communicating function for directly communicating with other vehicles without through a server or the like to transmit and receive information and a GPS receiving function for receiving positioning data from a plurality of GPS satellites.

The inter-vehicle communicating function performs inter-communication with other vehicles to exchange vehicle information, traveling information, and the like. An example of the vehicle information is unique information indicating a vehicle type (one of three vehicle types including car, truck and two-wheeled motor vehicle in this embodiment) and the traveling information includes information changing according to conditions such as a vehicle speed, position information, and turn signal information sent out when turning right or left. As described, the information transmitting and receiving unit 2 is provided as the information transmitting and receiving means, and the own vehicle position detecting means.

The synthesized image data memory 3 is provided as the intersection image data storing means and stores icon data and the like for displaying a traffic condition of the vehicle at an intersection on a pop-up window W to be described below.

The map data memory 4 is provided as the map data storing means and stores map data that can be freely displayed as a road map image on the display unit 9. The synthesized image data memory 3 and the map data memory 4 are configured by a mass storage such as a CD, DVD, and hard disk drive (HDD).

The driving condition detector 5 is a collective name of sensors and switches for detecting a driving condition of the own vehicle. Examples of the driving condition detector 5 include a vehicle speed sensor for detecting an own vehicle speed $V_O$, an accelerator opening degree sensor for detecting an accelerator opening degree $\theta_{ACC}$, a brake switch for detecting depression of a brake, and a turn signal switch for previously detecting a right or left turn.

The display request switch 6 is provided near the display unit 9 or the like, for example and configured to provide information such as vehicle information at an intersection by a pop-up window when a driver turns ON the display request switch 6 under a condition, such as that the own vehicle stops at an intersection to be described below.

The line-of-sight viewing direction detector 7 detects a direction of a line of sight of a driver using a so-called pupil-corneal reflection method, for example, and is configured to detect line-of-sight behavior by detecting that a virtual image on a cornea made by an infrared lamp is translated by eye ball movement due to the difference in centers of rotation between the cornea and the eye ball using a center of pupil as a reference while detecting the center of pupil at the same time by a view camera. The way of detecting the line-of-sight direction is not limited to this detection method, and the line-of-sight direction may be detected by another detection method (such as EOG (Electro-Oculography) method, sclera reflection method, cornea reflection method, and search coil method).

Figure 9:
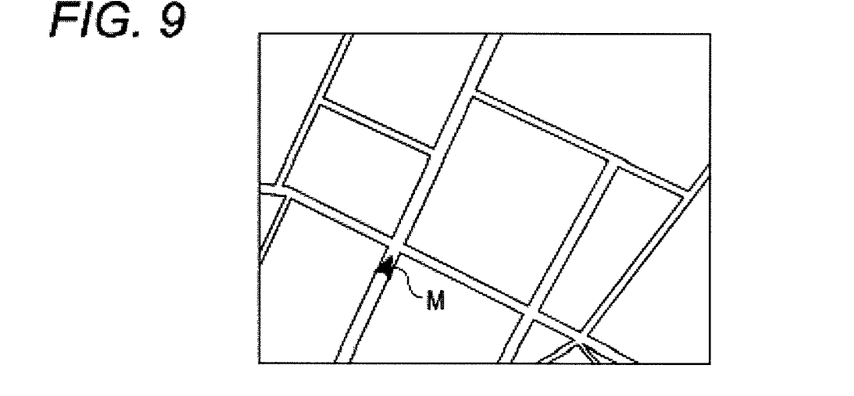
FIG. 9 is an explanatory view showing an example of a road map image that is normally displayed on a display unit according to the embodiment of the present invention.

The information processing unit 1 performs map matching with the map data stored in the map data memory 4 based on positioning information received by the transmitting and receiving unit 2 from GPS satellites to display a symbol of the own vehicle M on a road map image displayed on the display unit 9 (refer to FIG. 9). In addition, the information processing unit 1 extracts an intersection to be next entered by the own vehicle from the road map data, and displays a pop-up window W in a display area of the display unit 9 when the own vehicle is in an area of a set distance or less away from the extracted intersection (30 m from the center of the intersection, for example), when the own vehicle stops, when the brake switch is ON, and when a display request for an image of traffic conditions of vehicles at the intersection by the driver is recognized (when the display request switch 6 is ON or when it is recognized that the driver views the monitor (display unit 9) for two seconds or more). In the pop-up window W, icons of vehicle entering the intersection are displayed (refer to FIG. 10) based on information of oncoming vehicles O obtained by inter-vehicle communication. In particular, the pop-up window W is displayed in a part of area that does not hinder navigation display of the road map, such as a right end, for example in the embodiment. Then, if accelerator operation is performed in a predetermined way (the accelerator opening degree $\theta_{ACC}$ is continuously 10% or more for three seconds or more, for example) after the pop-up window W is displayed in the display area of the display unit 9, the information processing unit 1 stops displaying the pop-up window W. As described above, the information processing unit 1 has a function as the processing means.

Figure 2:
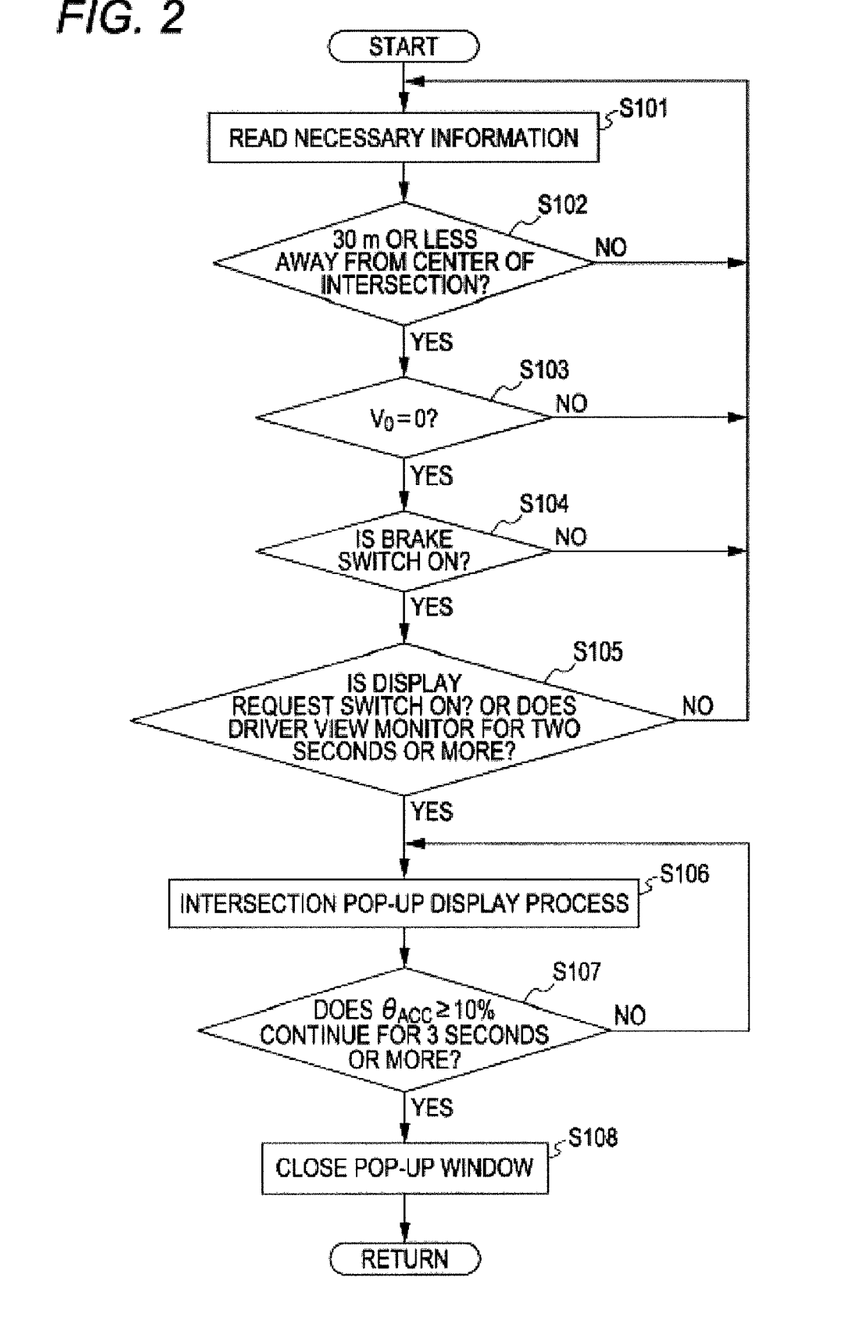
FIG. 2 is a flowchart of a program for displaying at the time of entering an intersection according to the embodiment of the present invention.

The display at the time of entering an intersection performed by the information processing unit 1 is processed according to flowcharts of FIGS. 2 to 6. A program for displaying at the time of entering an intersection shown in FIG. 2 is activated in every set computation period after an ignition switch is turned ON, and starts by reading necessary information in step (to be abbreviated to "S", hereinafter) 101.

Then the process proceeds to S102 to extract an intersection to be next entered by the own vehicle from the road map data, and to determine whether or not the own vehicle is in an area of a set distance or less away from the extracted intersection (30 m from the center of the intersection, for example). If it is determined in S102 that the own vehicle is in the area of the set distance or less away from the extracted intersection (30 m from the center of the intersection, for example), the process proceeds to S103, while if it is determined that the own vehicle is not in the area of the set distance or less away from the extracted intersection (30 m from the center of the intersection, for example), the process starts over from S101.

If it is determined in S102 that the own vehicle is in the area of a set distance or less away from the extracted intersection (30 m from the center of the intersection, for example) and the process proceeds to S103, it is determined whether or not the own vehicle stops ($V_O=0$). As a result of the determination, if it is determined that the own vehicle stops ($V_O=0$), the process proceeds to S104, while if it is determined that the own vehicle does not stop ($V_O \neq 0$), the process starts over from S101.

If it is determined in S103 that the own vehicle stops ($V_0=0$) and the process proceeds to S104, it is determined whether or not the brake switch is ON. As a result of the determination, if it is determined that the brake switch is ON, the process proceeds to S105 while if it is determined that the brake switch is OFF, the process starts over from S101.

If it is determined in S104 that the brake switch is ON and the process proceeds to S105, it is checked whether or not a display request for an image (pop-up window W) of traffic conditions of vehicles at the intersection by the driver is present. The display request may be recognized by whether or not the display request switch 6 is ON or whether or not the driver views the monitor (display unit 9) for two seconds or more. As a result of the determination, if it is determined that the display request for an image (pop-up window W) of traffic conditions of vehicles at the intersection by the driver is present, and thus it is determined that the display request switch 6 is ON or the driver views the monitor (display unit 9) for two seconds or more, the process proceeds to S106, while if the display request for an image (pop-up window W) of traffic conditions of vehicles at the intersection by the driver is not recognized, the process starts over from S101.

If it is determined in S105 that the display request for an image (pop-up window W) of traffic conditions of vehicles at the intersection by the driver is present and the process proceeds to S106, the pop-up window W is displayed in the display area of the display unit 9 according to an intersection pop-up display processing routine (FIG. 3) to be described below.

Thereafter, the process proceeds to S107 and it is determined whether or not the accelerator opening degree $\theta_{ACC}$ is continuously 10% or more for three seconds or more. If the accelerator opening degree $\theta_{ACC}$ is continuously 10% or more for three seconds or more, the process proceeds to S108 to close the pop-up window W displayed in S106 and then exits the program. If it is not detected that the accelerator opening degree $\theta_{ACC}$ is continuously 10% or more for three seconds or more, the process returns to S106.

Figure 3:
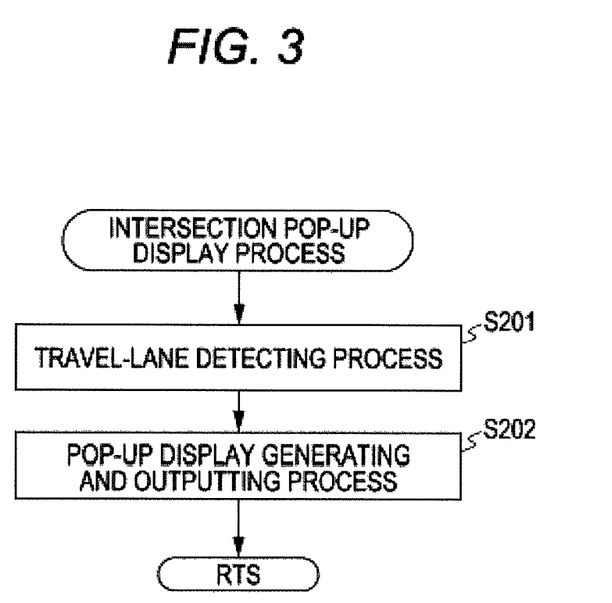
FIG. 3 is a flowchart of an intersection pop-up display process routine according to the embodiment of the present invention.

Next, the intersection pop-up display process routine performed in S106 described above will be described referring to a flowchart of FIG. 3.

First, a travel-lane detecting process is performed in S201. Specifically, roads displayed on the display unit 9 using the road map data stored in the map data memory 4 are displayed by nodes, which are given to intersections and points having changing properties, and links connecting the nodes. These nodes are provided on center lines of the roads. With the road map data, the roads are merely displayed as links connecting the nodes, and thus even if a traveling lane is composed of two lanes, for example, it cannot be determined whether an oncoming vehicle O traveling on the traveling lane is traveling on a traveling lane on the shoulder side (referred to as a "first lane", hereinafter) or on a traveling lane on the center line side (referred to as a "second lane", hereinafter).

Therefore, in s201, on which traveling lane the oncoming vehicle O in front is traveling is determined based on a relative position of the own vehicle M and the oncoming vehicle O. The travel-lane detecting process is performed according to a flowchart of the travel-lane detecting process shown in FIG. 4.

Figure 4:
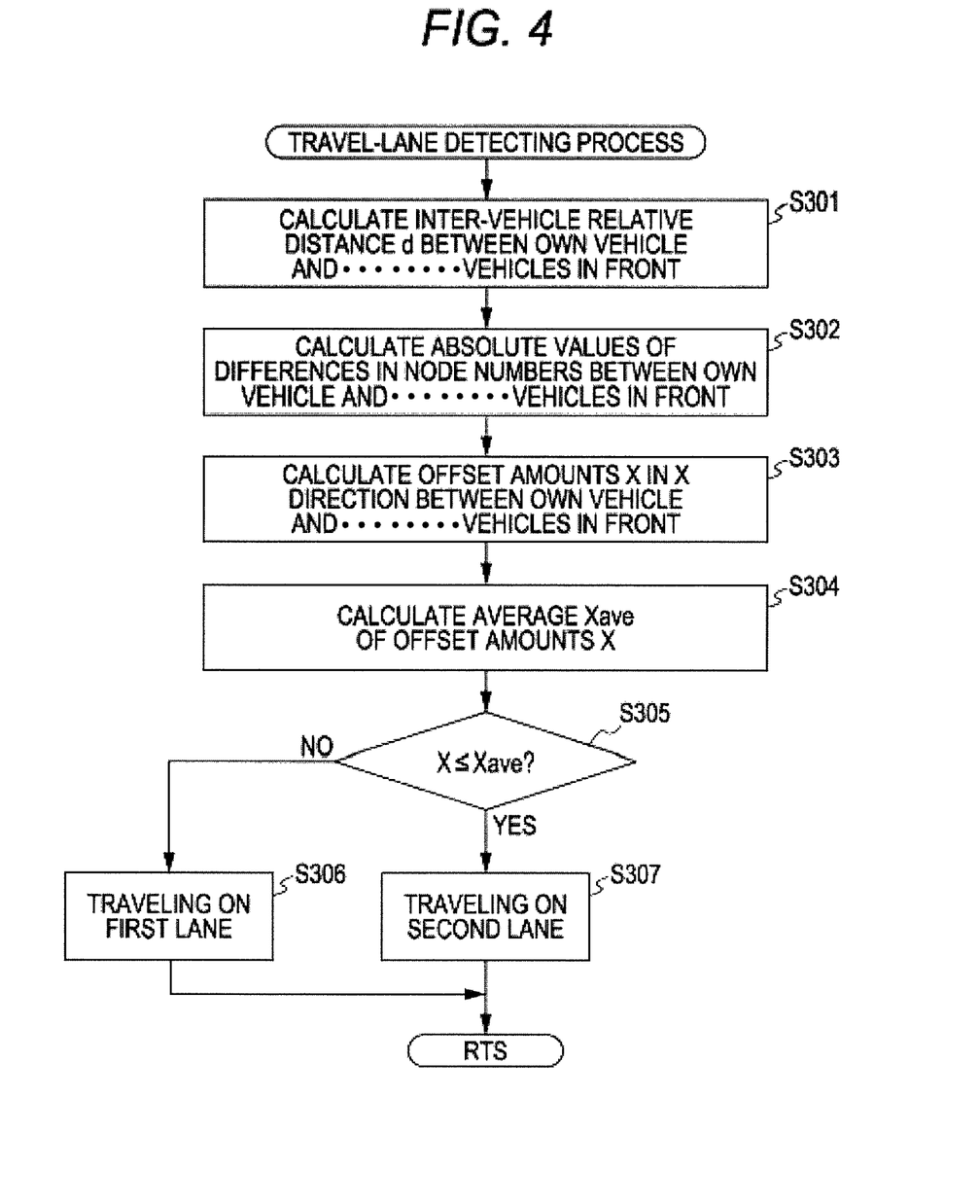
FIG. 4 is a flowchart of a travel-lane detecting process routine according to the embodiment of the present invention.

In the travel-lane detecting process, a distance (offset value) X in the road width direction between the own vehicle M and the oncoming vehicle O in front is calculated for a plurality of oncoming vehicles O in front and an average Xave of the offset values X is calculated. An offset value X of each oncoming vehicle O in front is compared with the average Xave as a reference position to determine a lane on which the oncoming vehicle O in front is traveling. The embodiment is an aspect when a position coordinates of oncoming vehicles O in front are unknown. If traveling information obtained by inter-vehicle communication includes position coordinates of oncoming vehicles O in front, offset values X can be calculated based on a relation between the position coordinates and the position coordinate of the own vehicle M.

First, inter-vehicle relative distances d between the own vehicle M and the oncoming vehicles O in front are calculated in S301. The inter-vehicle relative distances d between the own vehicle M and the oncoming vehicles O are measured using inter-vehicle communication, for example. Alternatively, if a millimeter-wave radar or a stereo camera is provided on the own vehicle M, the inter-vehicle relative distances d can be measured based on information obtained therefrom.

Figure 7:
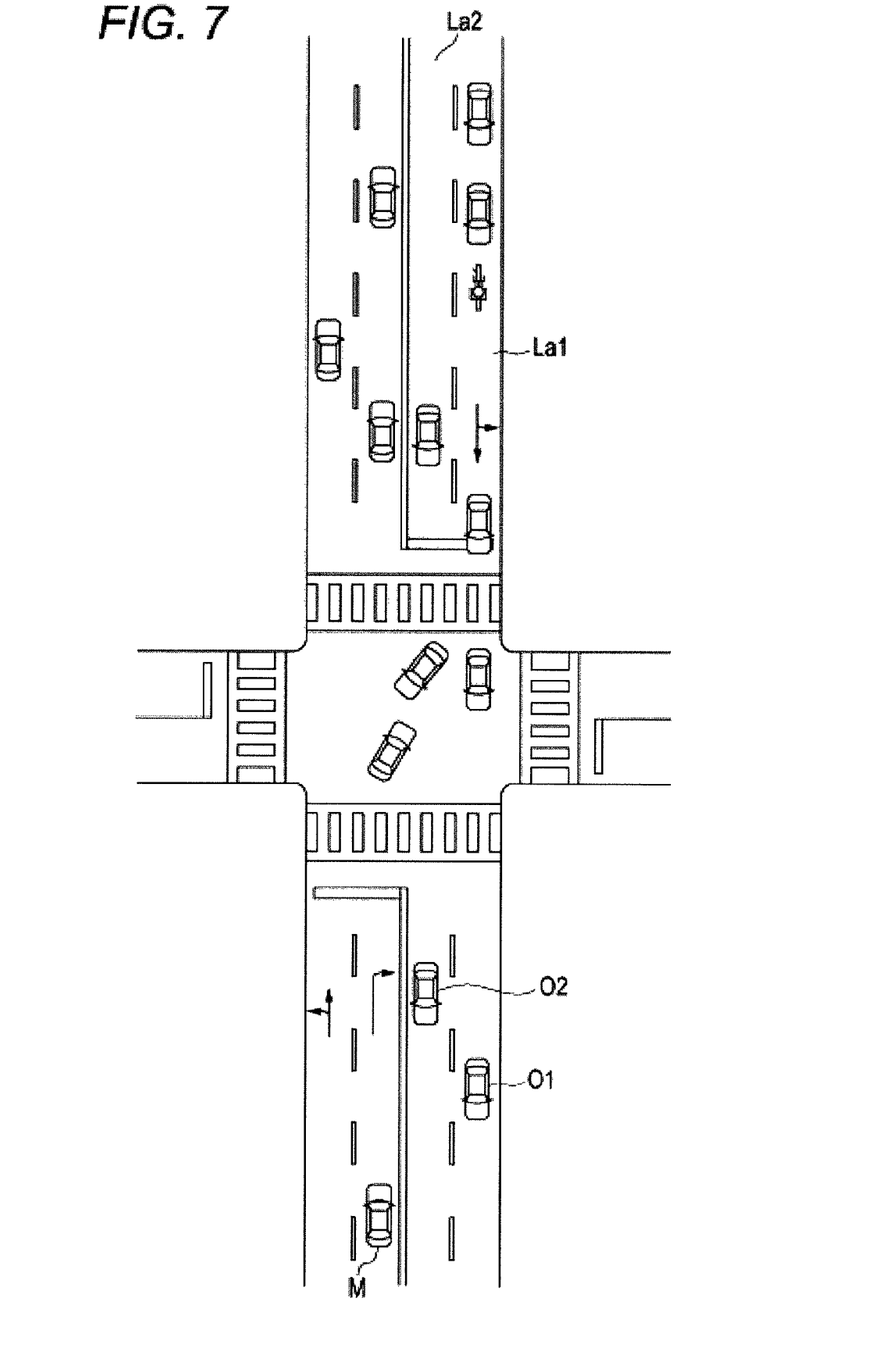
FIG. 7 is an explanatory view showing an example of a traveling condition of a vehicle according to the embodiment of the present invention.
Figure 8:
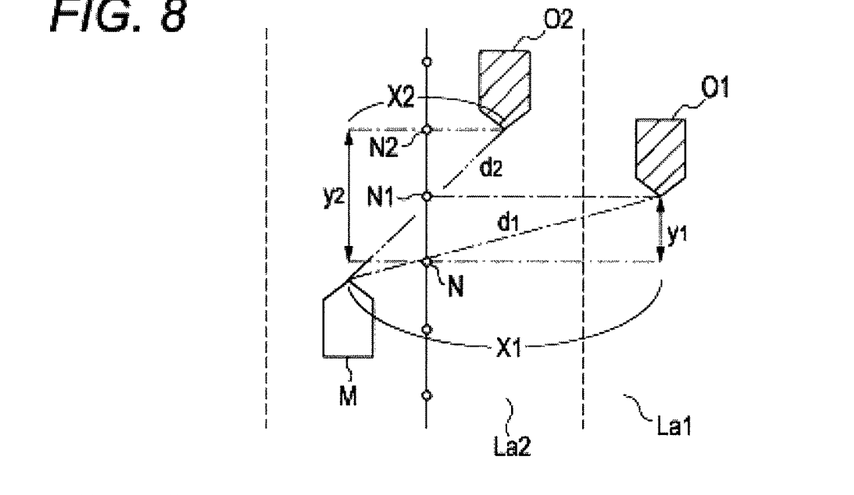
FIG. 8 is an explanatory view showing a procedure for calculating a border between a first lane and a second lane of an opposite lane according to the embodiment of the present invention.

A case where the inter-vehicle relative distances d are measured using the inter-vehicle communication will be briefly described. First, a plurality of oncoming vehicles O in front traveling on an opposite lane are detected. In FIGS. 7 and 8, oncoming vehicles O1 and O2 in front are shown. In the following description, the two oncoming vehicles O1 and O2 in front will be exemplified. A transmit and receive time period in inter-vehicle communication between the own vehicle M and the oncoming vehicles O1 and O2 in front that has been detected (a time period from a time when the own vehicle M transmits a request signal to a time when the own vehicle M receives a response signal, for example) is measured, and based on the measured time, inter-vehicle relative distances d1 and d2 between the own vehicle M and each of the oncoming vehicles O1 and O2 in front are respectively calculated (refer to FIG. 8).

Next, the process proceeds to S302 and node numbers N, N1, and N2 that are respectively of the closest nodes to the own vehicle M and the oncoming vehicles O1 and O2 in front are detected (refer to FIG. 8), and relative distances y1 and y2 in front are respectively calculated based on absolute values of differences between the node number N of the node that is closest to the own vehicle M and the node numbers N1 and N2 of the nodes that are closest to the oncoming vehicles O1 and O2 in front.

$$y1 = k|N-N1|$$

$$y2 = k|N-N2|$$

As shown in FIG. 8, a coordinate provided with each of the node numbers and each of the position coordinates of the own vehicle M and the oncoming vehicles O1 and O2 in front are not necessarily matched. However, since node numbers are provided at intervals of a few meters, relative positions can be determined with a certain degree of accuracy. In addition, distances between nodes are not always constant, but can depend on a distance to some extent (distance between nodes≈k×difference in node numbers, where k: coefficient). Therefore, the relative distances y1 and y2 in front can be simplistically calculated from differences in the node numbers.

Next, the process proceeds to S303 and the offset values X1 an X2 between the own vehicle M and the oncoming vehicles O1 and O2 in front are calculated based on the inter-vehicle relative distances d1 and d2 and the relative distances y1 and y2 in front, and using the Pythagorean theorem.

$$X1 = (d1^2 - y1^2)^{(1/2)}$$

$$X2 = (d2^2 - y2^2)^{(1/2)}$$

Next, the process proceeds to S304 and the average Xave of the offset values X1 and X2 is calculated. In the example shown in FIG. 8, a case where the opposite lane is composed of two lanes and each of the oncoming vehicles O1 and O2 in front is traveling on each of the lanes has been described, but the average Xave may be calculated based on three or more oncoming vehicles O in front.

Thereafter, the process proceeds to S305 and each of the offset values X and the average Xave are compared, and if X>Xave, the process proceeds to S306 to determine that the oncoming vehicle O in front is traveling on the first lane La1 and exits the routine. If X≦Xave, the process proceeds to S307 to determine that the oncoming vehicle O in front is traveling on the second lane La2 and exits the routine. As described above, in the embodiment, the average Xave is regarded as a border between the first lane La1 and the second lane La2 of the opposite lane. FIGS. 7 and 8 show a state where the oncoming vehicle O1 in front is traveling on the first lane La1 and the oncoming vehicle O2 in front is traveling on the second lane La2.

After the travel-lane detecting process in s201 described above is performed, the process proceeds to s202 to perform a process of generating and outputting a pop-up window W to be displayed. The pop-up display generating and outputting process is performed according to a flowchart of the pop-up display generating and outputting process shown in FIG. 5.

In this flowchart, first in S401, vehicle information and traveling information of all of oncoming vehicles O in front traveling on the first lane La1 in an area capable of inter-vehicle communication (100 [m], for example) in front of the own vehicle are read, the oncoming vehicles O in front which are detected in the travel-lane detecting process in above-mentioned s201 shown in FIG. 4. Then an icon display process for displaying the oncoming vehicles O traveling on the first lane La1 on a pop-up window W is performed. In S402, similarly, vehicle information and traveling information of all of oncoming vehicles O in front traveling on the second lane La2 in an area capable of inter-vehicle communication in front of the own vehicle are read, the oncoming vehicles O in front which are detected in the travel-lane detecting process in s201 shown in FIG. 4. Then an icon display process for displaying the oncoming vehicles O in front traveling on the second lane La2 on a pop-up window W is performed.

Figure 6:
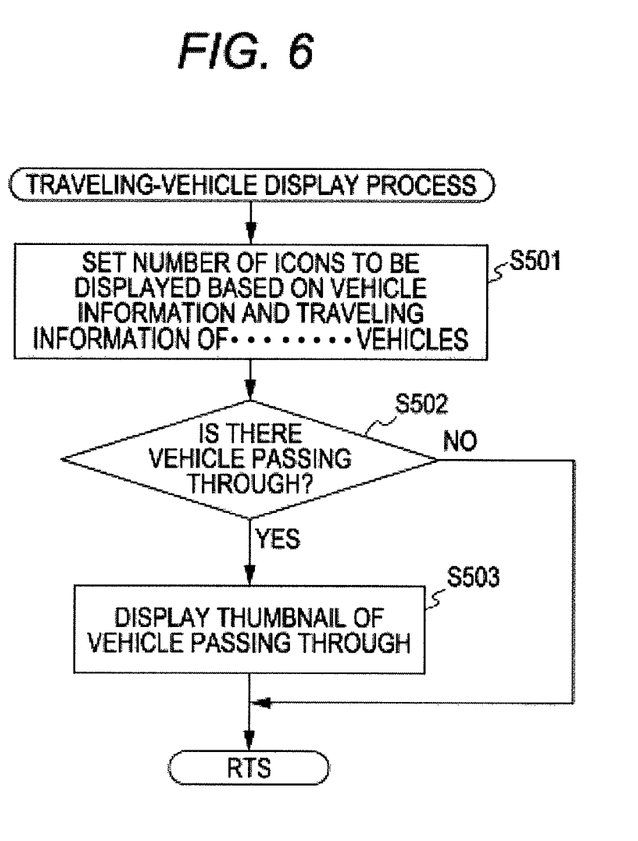
FIG. 6 is a flowchart of a traveling-vehicle display process routine according to the embodiment of the present invention.

The display processes performed in S401 and S402 are individually performed according to a flowchart of the traveling-vehicle display process shown in FIG. 6. Since the display processes performed in S401 and S402 are similar, they are collectively described.

Figure 10:
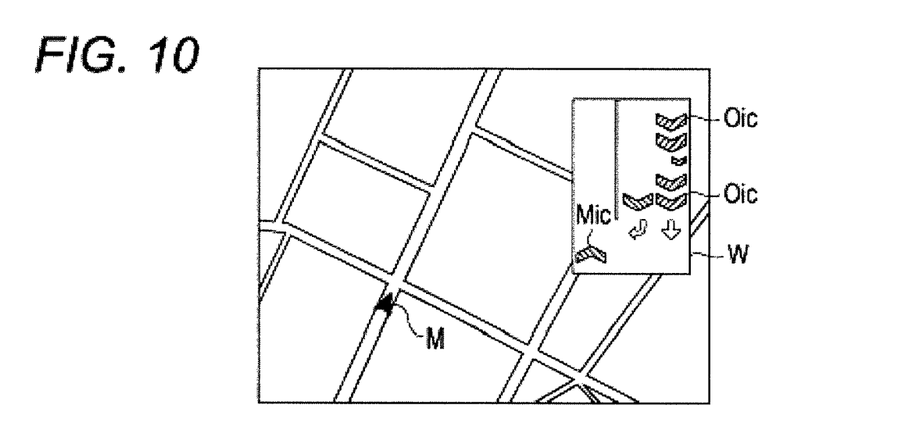
FIG. 10 is an explanatory view of a state that a pop-up window is displayed on a display unit at the time of entering an intersection according to the embodiment of the present invention.
Figure 11A:
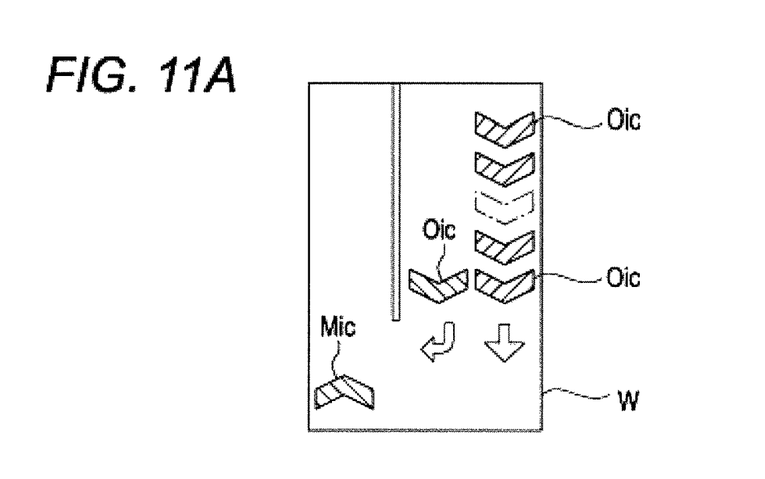
FIG. 11 is an explanatory view showing a display aspect of a pop-up window according to the embodiment of the present invention.
Figure 11B:
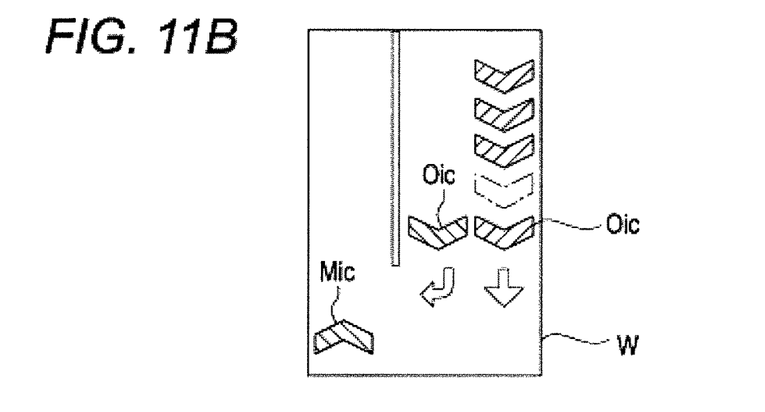
Figure 11C:
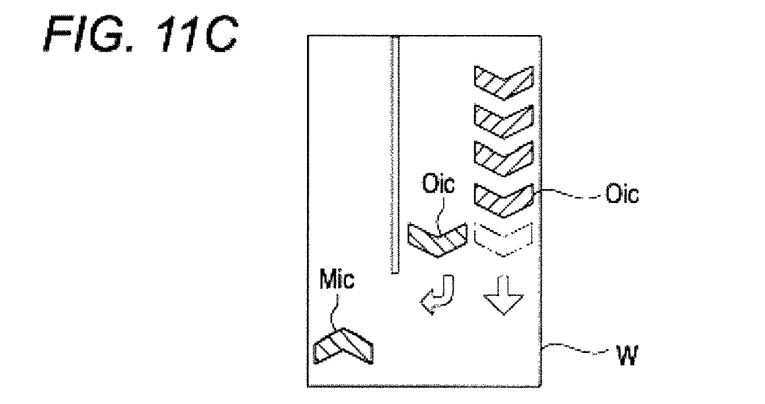

In the traveling-vehicle display process, first in S501, a display number of icons Oic to be displayed on a pop-up window W is set based on the vehicle information and the traveling information of the oncoming vehicles O traveling on the Lane La1 or La2 obtained by inter-vehicle communication. In the embodiment, the maximum number of icons Oic to be displayed on a pop-up window W is five in one line as shown in FIG. 10. If an inter-vehicle distance from a following vehicle is equal to or more than a preset space (10 [m], for example) as shown by a dashed line in FIG. 11, icons are displayed with a space corresponding to the inter-vehicle distance (thinning). The symbol Mic in FIGS. 10 and 11 is an icon of the own vehicle M.

Figure 12:
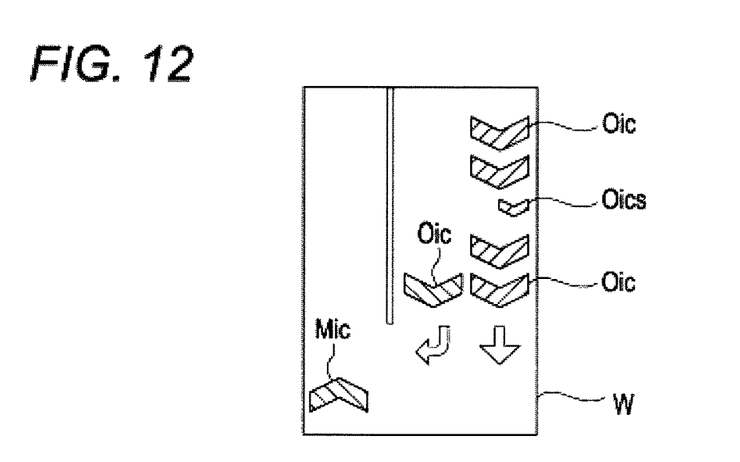
FIG. 12 is an explanatory view showing another display aspect of a pop-up window according to the embodiment of the present invention.

Next, the process proceeds to S502 to check whether or not there is a vehicle passing through. The "vehicle passing through" is an oncoming vehicle traveling straight passing through oncoming vehicles that stop at an intersection, and typically is an oncoming two-wheeled motor vehicle. In the step, it is checked whether or not there is a vehicle passing through by checking an inter-vehicle distance and speed difference between the each oncoming vehicle O in front and a following oncoming vehicle. If there is no vehicle passing through, the process exits the routine. On the other hand, if there is a vehicle passing through, the process proceeds to S503 to display a thumbnail of an icon Oics corresponding to the vehicle (refer to FIG. 12) and then exit the routine.

Figure 5:
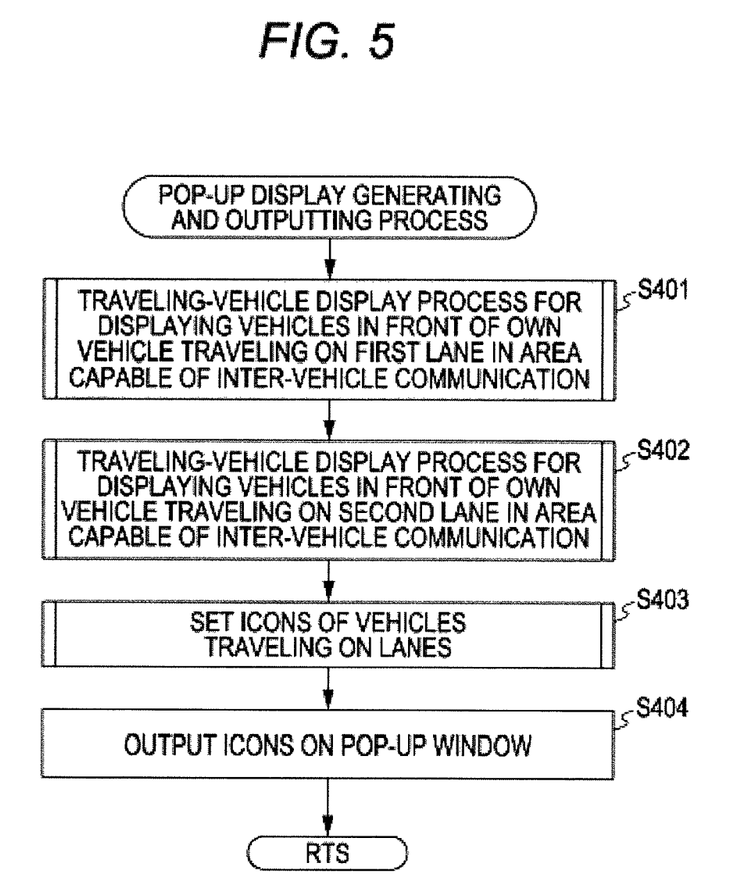
FIG. 5 is a flowchart of a pop-up display generating and outputting process routine according to the embodiment of the present invention.

When the process proceeds to S403 of FIG. 5, icons Oic to be displayed on a pop-up window W are set based on the display number of icons Oic for each of the traveling lanes La1 and La2 set in S401 and S402 and then the process proceeds to S404 to output the icons Oic on a pop-up window W and then exits the routine.

As described above, in the embodiment of the present invention, a pop-up window W is displayed in a display area of the display unit 9 when the own vehicle is in an area of a set distance or less away from the extracted intersection, when the own vehicle stops, when the brake switch is ON, and when a display request for an image of traffic conditions of vehicles at the intersection by the driver is recognized. If accelerator operation is performed in a predetermined way after the pop-up window W is displayed, the display of the pop-up window W is finished. Therefore, when a vehicle makes a right turn at an intersection or passes through an intersection, necessary information is appropriately provided to the driver when needed without preventing the driver from visually checking the traffic environment with his or her own eyes while driving. Therefore, and thereby safety can be enhanced.

In the embodiment, a pop-up window W is displayed when the own vehicle is in an area of a set distance or less away from the extracted intersection, when the own vehicle stops, when the brake switch is ON, and when a display request for an image of traffic conditions of vehicles at the intersection by the driver is recognized. However, either one or both of or the condition that the brake switch is ON and the condition that a display request for an image of traffic conditions of vehicles at the intersection by the driver is recognized may be eliminated according to a specification.

Figure 13:
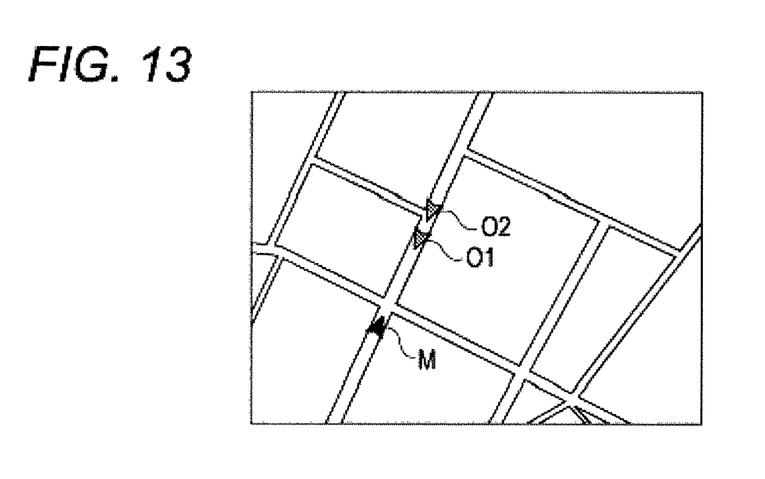
FIG. 13 is an explanatory view showing a display aspect of other than a pop-up window according to the embodiment of the present invention.

In the embodiment, a case where pop-up window W is displayed in a part of the display area of the display unit 9 is exemplified, but marks of the other vehicles O1 and O2 may be displayed on a display screen as shown in FIG. 13, for example rather than displaying a pop-up window W. In this case, in order to help distinguish between the own vehicle M and the other vehicles O1 and O2, the own vehicle M may be shown in red (filled in black in FIG. 13) and the other vehicles O1 and O2 may be shown in blue (shown by diagonal lines in FIG. 13), for example.

What is claimed is:
1. A vehicle information providing device comprising:
  information transmitting and receiving means for communicating between vehicles;
  own vehicle position detecting means for detecting a position of an own vehicle;
  map data storing means for storing road map data that can be freely displayed on displaying means;
  intersection image data storing means for storing image data for representing traffic conditions of vehicles at least at an intersection on the displaying means; and
  processing means for extracting an intersection to be entered by the own vehicle from the road map data, for generating an image of traffic conditions of vehicles at the intersection using the image data in the intersection image data storing means based on the information obtained by the information transmitting and receiving means, and for displaying the image on the displaying means only when a plurality of preset conditions are judged to be satisfied, wherein the plurality of preset conditions that must be judged to be satisfied include: the own vehicle is determined to be in an area within a preset distance away from a position of the intersection based on the position of the intersection and a position of the own vehicle; and the own vehicle is determined to be stopped.

2. The vehicle information providing device according to claim 1, wherein the plurality of preset conditions that must be judged to be satisfied further includes: a brake switch is determined to be ON.

3. The vehicle information providing device according to claim 2, wherein the plurality of preset conditions that must be judged to be satisfied further includes: a display request for the image of traffic conditions of vehicles at the intersection by a driver is recognized.

4. The vehicle information providing device according to claim 3, wherein the display request for the image of traffic conditions of vehicles at the intersection by the driver is recognized at least either: when a pre-provided switch is turned ON; or when a time period for which the driver views the display, as detected by a line-of-sight viewing direction detector for the driver that is mounted on the vehicle, is equal to or more than a set time.

5. The vehicle information providing device according to claim 1, wherein the processing means is configured to stop the display of the image of traffic conditions of vehicles at the intersection on the displaying means when it is determined that an accelerator operation is performed.

6. The vehicle information providing device according to claim 1, wherein the processing means is configured to perform map matching on the position of the own vehicle detected by the own vehicle position detecting means with the map data stored in the map data storing means to display the position of the own vehicle on the displaying means, and to display the image of the traffic conditions of vehicles at the intersection by replacing a part or whole of the map data that is displayed when the image of the traffic conditions of vehicles at the intersection is to be displayed.

7. The vehicle information providing device according to claim 1, wherein the plurality of preset conditions that must be judged to be satisfied further includes: a display request for the image of traffic conditions of vehicles at the intersection by a driver is recognized.

8. The vehicle information providing device according to claim 7, wherein the display request for the image of traffic conditions of vehicles at the intersection by the driver is recognized at least either: when a pre-provided switch is turned ON; or when a time period for which the driver views the display, as detected by a line-of-sight viewing direction detector for the driver that is mounted on the vehicle, is equal to or more than a set time.

9. The vehicle information providing device according to claim 1, wherein the processing means is configured such that one or more of the preset conditions may be eliminated upon specification.

10. The vehicle information providing device according to claim 9, wherein the processing means is configured such that either one or both of the condition that the brake switch is determined to be ON, and the condition that a display request by the driver is recognized may be eliminated upon specification.

11. A vehicle information providing device comprising:

an information transmitting and receiving unit configured to communicate between vehicles;

an own vehicle position detecting unit configured to detect a position of an own vehicle;

a map data storing unit configured to store road map data that can be freely displayed on displaying unit;

an intersection image data storing unit configured to store image data representing traffic conditions of vehicles at least at an intersection on the displaying unit; and a processing unit configured to extract an intersection to be entered by the own vehicle from the road map data, to generate an image of traffic conditions of vehicles at the intersection using the image data in the intersection image data storing unit based on the information obtained by the information transmitting and receiving unit, and to display the image on the displaying unit only when a plurality of preset conditions are judged to be satisfied, wherein the plurality of preset conditions that must be judged to be satisfied include: the own vehicle is determined to be in an area within a preset distance away from a position of the intersection based on the position of the intersection and a position of the own vehicle; and the own vehicle is determined to be stopped.

12. The vehicle information providing device according to claim 11, wherein the plurality of preset conditions that must be judged to be satisfied further includes: a brake switch is determined to be ON.

13. The vehicle information providing device according to claim 12, wherein the plurality of preset conditions that must be judged to be satisfied further includes: a display request for the image of traffic conditions of vehicles at the intersection by a driver is recognized.

14. The vehicle information providing device according to claim 13, wherein the display request for the image of traffic conditions of vehicles at the intersection by the driver is recognized at least either: when a pre-provided switch is turned ON; or when a time period for which the driver views the display, as detected by a line-of-sight viewing direction detector for the driver that is mounted on the vehicle, is equal to or more than a set time.

15. The vehicle information providing device according to claim 11, wherein the processing unit is configured to stop the display of the image of traffic conditions of vehicles at the intersection on the displaying unit when it is determined that an accelerator operation is performed.

16. The vehicle information providing device according to claim 11, wherein the processing unit is configured to perform map matching on the position of the own vehicle detected by the own vehicle position detecting unit with the map data stored in the map data storing unit to display the position of the own vehicle on the displaying unit, and to display the image of the traffic conditions of vehicles at the intersection by replacing a part or whole of the map data that is displayed when the image of the traffic conditions of vehicles at the intersection is to be displayed.

17. The vehicle information providing device according to claim 11, wherein
the processing unit is configured such that one or more of the preset conditions may be eliminated upon specification.

18. The vehicle information providing device according to claim 17, wherein
the processing unit is configured such that either one or both of the condition that the brake switch is determined to be ON, and the condition that a display request by the driver is recognized may be eliminated upon specification.

19. The vehicle information providing device according to claim 11, wherein
the plurality of preset conditions that must be judged to be satisfied further includes: a display request for the image of traffic conditions of vehicles at the intersection by a driver is recognized.

20. The vehicle information providing device according to claim 19, wherein
the display request for the image of traffic conditions of vehicles at the intersection by the driver is recognized at least either: when a pre-provided switch is turned ON; or when a time period for which the driver views the display, as detected by a line-of-sight viewing direction detector for the driver that is mounted on the vehicle, is equal to or more than a set time.

* * * * *